US008010046B2

(12) United States Patent
Goto

(10) Patent No.: US 8,010,046 B2
(45) Date of Patent: Aug. 30, 2011

(54) WIRELESS COMMUNICATION APPARATUS

(75) Inventor: Takeshi Goto, Fukuoka (JP)

(73) Assignee: Panasonic Corporation, Osaka (JP)

(*) Notice: Subject to any disclaimer, the term of this patent is extended or adjusted under 35 U.S.C. 154(b) by 733 days.

(21) Appl. No.: 12/105,511

(22) Filed: Apr. 18, 2008

(65) Prior Publication Data
US 2008/0274709 A1 Nov. 6, 2008

(30) Foreign Application Priority Data

Apr. 20, 2007 (JP) ................ P2007-111299

(51) Int. Cl.
*H04B 5/00* (2006.01)

(52) U.S. Cl. .............. 455/41.1; 455/63.1; 455/249.1; 455/522; 455/69; 455/226.2; 455/230; 370/342; 370/343; 375/130

(58) Field of Classification Search .......... 455/41.1, 455/63.1, 249.1, 522, 69, 230, 226.2; 370/342, 370/343; 375/130
See application file for complete search history.

(56) References Cited

U.S. PATENT DOCUMENTS

| 6,141,334 | A  | * | 10/2000 | Flanagan et al. | 370/342 |
|-----------|----|---|---------|-----------------|---------|
| 6,177,906 | B1 | * | 1/2001  | Petrus          | 342/378 |
| 6,212,399 | B1 | * | 4/2001  | Kumar et al.    | 455/522 |
| 6,240,147 | B1 | * | 5/2001  | Muramatsu et al.| 375/344 |
| 6,415,002 | B1 | * | 7/2002  | Edwards et al.  | 375/261 |
| 7,411,921 | B2 | * | 8/2008  | Strong et al.   | 370/328 |
| 7,567,179 | B2 | * | 7/2009  | Stephensen et al.| 340/572.1 |
| 7,660,338 | B2 | * | 2/2010  | Smith et al.    | 375/131 |
| 7,667,572 | B2 | * | 2/2010  | Husak et al.    | 340/10.1 |
| 7,667,575 | B2 | * | 2/2010  | Husak et al.    | 340/10.2 |
| 7,692,532 | B2 | * | 4/2010  | Fischer et al.  | 340/10.2 |
| 2007/0072567 | A1 | * | 3/2007 | Nagai et al.    | 455/205 |

FOREIGN PATENT DOCUMENTS

| JP | 8-122429    | 5/1996  |
| JP | 2006-014072 | 1/2006  |
| WO | 2005/112285 | 11/2005 |

OTHER PUBLICATIONS

English language Abstract of JP 8-122429.
English language Abstract of JP 2006-014072.

* cited by examiner

*Primary Examiner* — Marceau Milord
(74) *Attorney, Agent, or Firm* — Greenblum & Bernstein, P.L.C.

(57) ABSTRACT

A wireless communication apparatus for demodulating modulated information which is transmitted from a wireless tag so as to read out the modulated information, includes: an antenna which transmits a transmission signal to the wireless tag and receives a signal transmitted from the wireless tag as a reception signal; a demodulator which demodulates the reception signal to output a demodulated signal; a signal output unit which outputs a proportional signal proportional to the transmission signal; and a controller which calculates the proportional signal and the demodulated signal to output an calculated signal, and calculates the calculated signal and the reception signal.

8 Claims, 4 Drawing Sheets

WIRELESS COMMUNICATION APPARATUS

BACKGROUND

1. Technical Field

The present invention relates to a wireless communication apparatus capable of obtaining higher receiver sensitivities even when transmission signals are mixed into receiving circuits.

2. Background Art

Very recently, instead of bar codes, a specific attention has been paid to non-contact type wireless tags known as RFID (Radio Frequency Identification) tags and the like. Then, it is predictable that these RFID tags and the like are attached to any sorts of articles, and these articles provided with these RFID tags are supplied in markets. Under such a circumstance, wireless communication apparatuses such as reader/writer apparatuses have been popularized which communicate with these RFID tags in non-contact manners.

Communication systems operable between these RFID tags and wireless communication apparatuses may be mainly classified into the below-mentioned communication systems. A first type is a communication system based upon electromagnetic induction. Within this electromagnetic induction type communication system, two sorts thereof have been proposed: That is, in one sort of the electromagnetic induction type communication system, a usable frequency is selected to be 400 KHz to 530 KHz; an electronic component (coils) having a high electromagnetic coupling degree such as a transformer is employed; and a communication is established between a coil of an RFID tag and a coil of a reader by utilizing mutual induction and mutual electromagnetic induction. In the other sort of the electromagnetic induction type communication system, electromagnetic waves having frequencies lower than or equal to 250 KHz, or a frequency of 13.56 MHz are utilized; an electronic component (coils) having a relatively low electromagnetic coupling degree is employed; and a communication is established by utilizing induction voltages between these coils. A communication distance of the former type system is short, namely several centimeters at maximum, whereas a communication distance of the latter type system is relatively long, namely several tens of centimeters.

In contrast to the above-described electromagnetic induction type communication systems, electric wave systems have been proposed as the second type. That is, microwaves radiated from an antenna of a wireless communication apparatus are received by a plane-wave antenna of an RFID tag, and data is transmitted by utilizing reflection waves from this RFID tag. Similarly, within the above-described microwave system, there are tow sorts of communication systems, namely, data is communicated by utilizing microwaves having a frequency of 2.45 GHz; and data is communicated by utilizing electric waves of the UHF (860 MHz to 960 MHz) frequency band. A communication distance of the former microwave system is approximately one meter at maximum, whereas a communication distance of the latter microwave system is relatively long, namely, eight meters at maximum.

There is one problem in such a case that a communication is carried out by employing either the electromagnetic induction system or the electric wave system. That is to say, when a single antenna is commonly used in both a transmission side and a reception side and the antenna receives a reflection wave from an RFID tag, a transmission wave generated on the transmission side is wrapped into a reflection wave and is mixed with the reflection wave, which constitutes an interference signal. As a result, the interference signal may give an adverse influence to a reception signal derived from the RFID tag. Also, even in such a case that antennas are independently employed in transmission and reception operations without employing an antenna duplexer, a transmission wave supplied from the transmission side is directly received, or is reflected on a peripheral article and then is received by the reception antenna provided on the reception side, so that this transmission signal may interfere with the reception signal, which may give an adverse influence to the reception signal.

As a consequence, conventionally, the following methods have been proposed (refer to, for instance, JP-A-H8-122429): That is, while offset waves (compensating signals) are produced in order to offset (compensate) unwanted waves which are mixed and interfere with reception systems when transmission waves are transmitted, the produced offset waves are synthesized with the unwanted waves.

In the method as described in JP-A-H8-122429, a phase and an amplitude of such a signal which has been demultiplexed from the transmission system are controlled by a variable phase shifter and a variable attenuator so as to produce an offset wave, and then, this offset wave is synthesized with a reception wave by a multiplexer in order to cancel the unwanted wave. The setting operation of the offset wave is controlled by manually operating both the variable phase shifter and the variable attenuator in such a manner that a transmission signal is transmitted from a wireless communication apparatus (interrogator) under such a condition that no reflection response is transmitted from an RFID tag (responder), and a level of a synthesized signal between a signal mixed into a reception system and the offset signal may become a minimum level under this condition.

However, in this system, it is not clear and concrete how the level of the synthesized signal is adjusted to a minimum level. Moreover, for instance, in such a case that a metal article and the like are present which may give an adverse influence to a wireless communication, and positions of the metal article are moved, a large adverse influence may be given to the synthesized signal. Then, this conventional system cannot produce offset waves (compensating signals) in response to circumferential changes in a real time manner. As a result, other wireless communication apparatuses have been proposed (refer to, for instance, JP-A-2006-14072). That is, the wireless communication apparatuses can perform offset operations by utilizing offset waves in response to such an environmental change in a real time manner, and can maintain higher receiver sensitivities.

The wireless communication apparatus as described in JP-A-2006-14072 includes a transmitting unit, a receiving unit, a cancel circuit, an RSSI (Received Signal Strength Indictor) circuit, and a control circuit. The transmitting unit is capable of transmitting a carrier wave to access a wireless tag to the wireless tag. The receiving unit is capable of receiving a transmission signal sent from the wireless tag in response to the transmission signal transmitted from the transmitting unit. The cancel circuit generates an offset wave for offsetting an unwanted wave which may be generated based upon the transmission signal from the transmitting unit when receiving the transmission signal. The RSSI circuit detects a strength of a reception signal received by the receiving unit, which has been offset by the offset wave. The control circuit outputs a carrier wave so that the transmitting unit transmits the carrier wave before the modulation wave is outputted from the transmitting unit so that the modulated wave is transmitted to the wireless tag, and change a phase and an amplitude of the offset wave generated by the cancel circuit in response to a detection result obtained in the RSSI circuit to control the respective cancel circuit and other units in order to set an optimum value.

As previously described, in the wireless communication apparatus described in JP-A-H8-122429, the transmission signal is transmitted from the wireless communication apparatus; and the offset wave is controlled by manually operating the variable phase shifter and the variable attenuator in such a manner that the level of the synthesized signal between the signal mixed in the reception system and the offset wave may become minimum.

However, in this conventional system, although the variable phase shifter and the variable attenuator are manually controlled, the concrete control operations must be carried out by a user; there is no clear instruction how to control these variable phase shifter and variable attenuator; and further, an external influence may be readily given to these control operations. In addition, this conventional system cannot produce the offset waves (compensation signals) in response to the circumferential changes in the real time mode.

As to this technical difficult point, the wireless communication apparatus described in JP-A-2006-14072 can perform the offset operation by employing the offset waves in response to the environmental changes in the real time mode, and thus, can maintain the higher receiver sensitivities. To this end, the wireless communication apparatus is equipped with the RSSI circuit for detecting the strength of the reception signal received by the receiving unit, which has been offset by the offset wave; and the control circuit for controlling the respective cancel circuit and other relevant units in such a manner that the phase and the amplitude of the offset wave generated by the cancel circuit are changed in response to the detection result obtained in the RSSI circuit so as to set the optimum value.

However, in the wireless communication apparatus described in JP-A-2006-14072, while a large number of monitoring points are set, the received signal strengths are sequentially measured at the respective monitoring points, and then, such a monitoring point that the received signal strength becomes minimum is defined as an optimum point. However, the above-described measuring method can hardly become an effective measuring method. Moreover, there is a limitation as to the detection precision of the RSSI circuit. Also, while both a phase and an amplitude of a cancel signal are changed based upon an output signal supplied from a VCO (Voltage-Controlled Oscillator) in response to a detection result obtained from the RSSI circuit, the noise from the transmission signal after the baseband signal has been mixed with the detection signal cannot be removed. As a result, if the RSSI circuit is employed, then a lengthy time is required for canceling the unwanted wave, and further, there is a limitation even in the canceling level for the unwanted wave.

In addition, although the above-described wireless communication apparatus is equipped with an I/Q modulating and demodulating circuit for demodulating the reception signal, the RSSI circuit is provided so as to change the phase and the amplitude of the offset wave, which is independent from the I/Q modulating and demodulating circuit. As a result, there is such a risk that the basic arrangement inherent to the wireless communication apparatus cannot be sufficiently utilized.

SUMMARY

As a consequence, the present invention has an object to provide a wireless communication apparatus capable of obtaining a higher receiver sensitivity, and also, capable of removing a noise caused from a transmission signal, while a structural arrangement inherent to the wireless communication apparatus can be effectively utilized.

To solve the above-described problems, a wireless communication apparatus, according to the present invention, is mainly featured by such a wireless communication apparatus for demodulating modulated information which is transmitted from a wireless tag so as to read out the modulated information, including: an antenna which transmits a transmission signal to the wireless tag and receives a signal transmitted from the wireless tag as a reception signal; a demodulator which demodulates the reception signal to output a demodulated signal; a signal output unit which outputs a proportional signal proportional to the transmission signal; and a controller which calculates the proportional signal and the demodulated signal to output an calculated signal, and calculates the calculated signal and the reception signal.

In accordance with the wireless communication apparatus of the present invention, even in such a case that the transmission signal is mixed into the reception signal, the higher receiver sensitivities thereof can be achieved, while the arrangement inherent to the wireless communication apparatus may be effectively operated, and further, noises generated from the transmission signal can be eliminated.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION

First Embodiment

Figure 1:
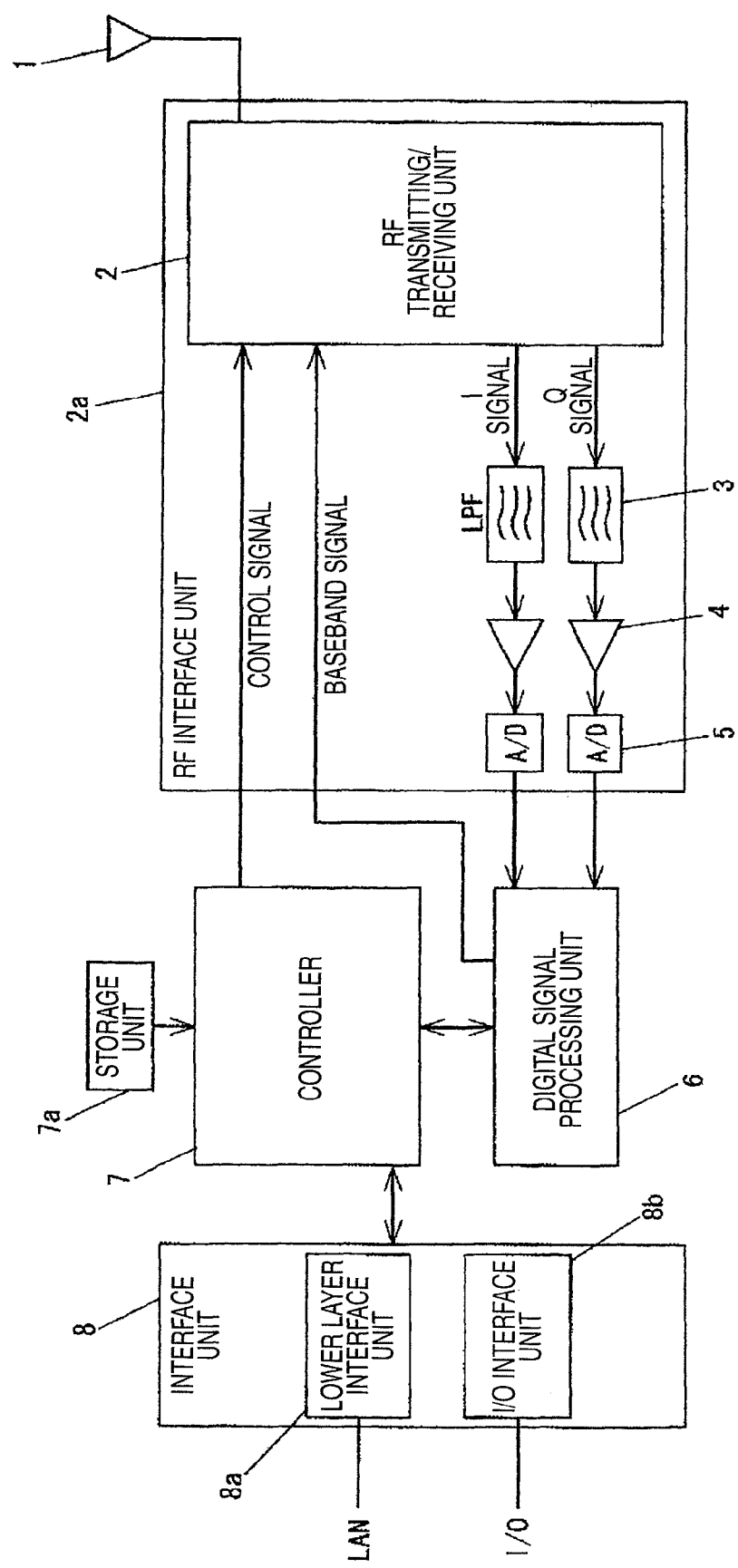
FIG. 1 is a diagram for showing an entire arrangement of a wireless communication apparatus according to a first embodiment of the present invention.
Figure 2:
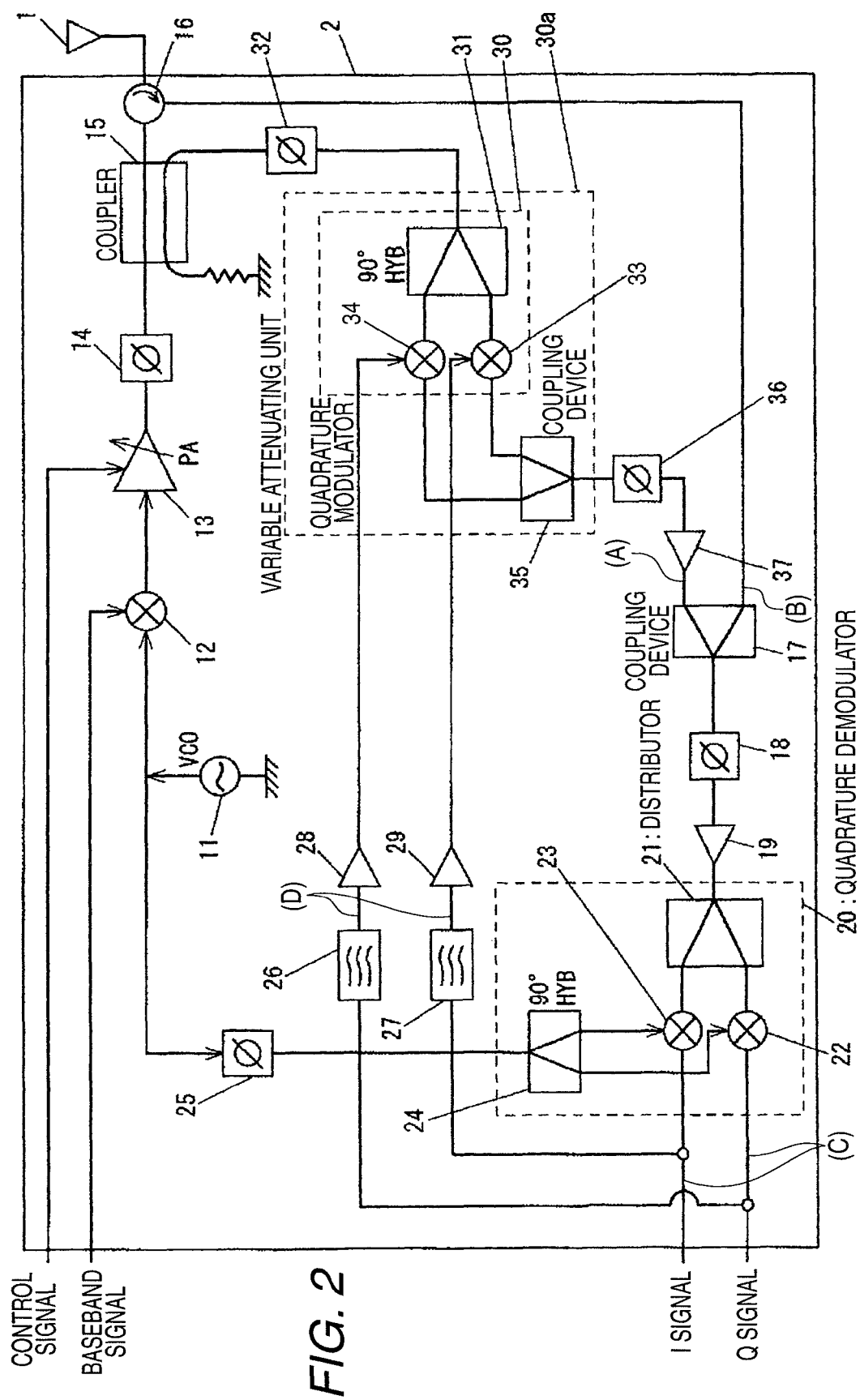
FIG. 2 is a circuit diagram for indicating an RF transmitting/receiving unit of the wireless communication apparatus according to the first embodiment of the present invention.

A description is made of a wireless communication apparatus according to a first embodiment of the present invention. The wireless communication apparatus of the first embodiment corresponds to a reader/writer apparatus for communicating with an RFID (Radio Frequency Identification) tag by utilizing electric waves, and also, corresponds to such a wireless apparatus equipped with an antenna duplexer. FIG. 1 is a block diagram for showing an entire arrangement of the wireless communication apparatus according to the first embodiment of the present invention. FIG. 2 indicates a circuit arrangement of an RF transmitting/receiving unit employed in the wireless communication apparatus according to the first embodiment of the present invention.

In FIG. 1, an antenna 1 communicates with an RFID tag (referred to as "wireless tag" hereinafter, and being not shown in the drawing) in wireless at frequencies of the UHF band, namely, 860 MHz to 960 MHz, and 2.45 GHz.

An RF transmitting/receiving unit 2 indicated in FIG. 1 transmits a transition wave for requesting a reading instruction from the antenna 1 toward the wireless tag based upon the ASK (Amplitude Shift Keying) system, or the like. Also, the RF transmitting/receiving unit 2 receives reflection waves corresponding to responses from this wireless tag and quadrature-demodulates the received reflection waves. This RF transmitting/receiving unit 2 performs the quadrature demodulation for detecting operation, and at the same time, performs a quadrature-modulation feedback (Cartesian feedback) so as to reduce a noise component. In other words, due to both the above-described functions, the RF transmitting/receiving unit 2 outputs two quadrature signals (namely, I signal and Q signal) when the reception signal is detected, namely, outputs the I signal of the phase reference, and the Q signal whose phase is delayed by 90 degrees from that of the I signal. An RF interface unit 2a of FIG. 1 contains analog circuits including detecting-purpose circuits (will be discussed later), while the above-described RF transmitting/receiving unit 2 is contained as a core.

Low-pass filters 3 remove high frequency components produced in connection with the quadrature demodulation so as to derive demodulated signals when the detecting operation is carried out. Amplifying units 4 amplify the I signal and the Q signal respectively, which contain a phase difference of 90 degrees each other and have been derived by the low-pass filters 3. A/D converting units 5 A/D-convert the respective I signal and Q signals amplified by the amplifying units 4 into digital signals. As previously explained, the low-pass filters 3, the amplifying units 4, and the A/D converting units 5 are provided in the analog RF interface unit 2a. A digital signal processing unit 6 demodulates the signals which have been A/D-converted and are outputted from the respective A/D converting unit 4 so as to decode the response data transmitted from the wireless tag.

In FIG. 1, there are provided a controller 7 for controlling the reader/writer apparatus, a storage unit 7a, and an interface unit 8 which communicates with a network so as to input/output data via an I/O connector. The above-described controller 7 is constructed by employing a microprocessor in a hardware manner, and is equipped with a large number of function means which executes control operations of the reader/writer apparatus; and these means realize the respective functions in such a manner that respective programs stored in the storage unit 7a are read therefrom, and the read programs are loaded in a main memory so as to be executed. As a consequence, any of these function means correspond to the function realizing means constituted in a software manner.

In the interface unit 8, a lower layer interface unit 8a which communicates with the network such as a LAN, and an I/O interface unit 8b for inputting/outputting data from the I/O connector are provided. The controller 7 receives response data transmitted from the wireless tag via the digital signal processing unit 5. Then, either a communication control means or an output control means employed in the controller 7 can transmit the received response data to an upper appliance connected to the network, or a lower appliance of an output destination, via the lower layer interface unit 8a, or the I/O interface 8b respectively. Then, the controller 7 outputs a control signal to the RF transmitting/receiving unit 2, and also, instructs the digital signal processing unit 6 to output such a command for requesting a reading operation to the wireless tag as a baseband signal with respect to the RF transmitting/receiving unit 2, and then, causes the baseband signal to be mixed with a carrier signal (discussed later) which is oscillated in the RF transmitting/receiving unit 2.

Subsequently, a description is made of a circuit arrangement of the RF transmitting/receiving unit 2 employed in the reader/writer apparatus of the first embodiment with reference to FIG. 2. The RF transmitting/receiving unit 2 includes a transmitting circuit, a receiving circuit, and a quadrature modulation feedback circuit. The transmitting circuit multiplies the baseband signal by the carrier signal so as to synthesize a transmission signal, and then, transmits the synthesized transmission signal from the antenna 1. The receiving circuit receives a signal sent from the wireless tag as a reception signal so as to quadraturely demodulate the reception signal. The quadrature modulation feedback circuit reduces an interference signal generated when the transmission signal is mixed into the reception signal, and furthermore, removes noise produced from the amplifiers 4.

First, a description is made of the transmission circuit portion of the RF transmitting/receiving unit 2. In FIG. 2, there is provided a local oscillating circuit 11 (Local Oscillator) such as a VCO capable of generating an oscillation signal having a predetermined frequency. This local oscillating circuit 11 supplies a transmission-purpose carrier signal, and also, supplies such a local oscillation signal which is employed when the reception signal from the wireless tag is quadraturely demodulated.

A multiplier 12 in FIG. 2 multiplies the baseband signal transmitted from the digital signal processing unit 5 by the local oscillation signal supplied from the local oscillating circuit 11. The baseband signal is employed so as to input such a command to the multiplier 12 as a signal, while this command requests to read with respect to the wireless tag. The baseband signal is modulated with a carrier wave having a high frequency based upon the ASK system, and the ASK-modulated baseband signal constitutes a transmission signal, and then, this transmission signal is outputted from the multiplier 12. An amplifier 13 amplifies the above-described transmission signal. A fixed phase shifter 14 delays a phase of the transmission signal outputted from the amplifier 13 by "$\phi 1$."

A coupler 15 derives a signal having a low level which is proportional to the transmission signal. The coupler 15 corresponds to a signal output unit and a duplexer of the present invention. An antenna duplexer 16 such as a circulator transmits a transmission signal via the antenna 1, and receives a reception signal from the antenna 1. If the antenna duplexer 16 is employed, then at lest a portion of the transmission signal is mixed into the reception signal. However, in this first embodiment, since a quadrature modulation feedback circuit (explained later in detail) is provided in the RF transmitting/receiving unit 2, this RF transmitting/receiving unit 2 controls a signal level of a signal derived from the coupler 15 based upon an I signal and a Q signal, which are negatively fed back, so as to reduce and cancel a level of an interference signal which is caused by this wraparound signal.

As a consequence, a description is made of the receiving circuit portion of the RF transmitting/receiving unit 2. A coupling device 17 adds and mixes a feedback signal outputted from the quadrature modulation feedback circuit to a reception signal received from the antenna 1 so as to output the mixed signal. Due to this adding/mixing operation, the interference signal mixed from the antenna duplexer 16 is reduced, and such a reception signal which contains substantially no interference signal is outputted from the coupling device 17. A phase of this output signal is controlled by the fixed phase shifter 18, and furthermore, a gain of this output signal is controlled by the amplifier 19.

The reception signal amplified in this amplifier 19 is thereafter entered to a quadrature demodulator 20 so as to be quadraturely demodulated, so that two quadrature signals (namely, I signal and Q signal) are produced, while the I signal is a phase reference signal, and the Q signal has a phase delayed by 90 degrees with respect to the phase of the I signal. One pair of these two quadrature signals is outputted to the low-pass filter 3, and the other pair thereof is negative-fed back by the quadrature modulation feedback circuit.

In FIG. 2, there is provided a distributor 21 which is employed in order to produce two signals having such a phase difference from each other by 90 degrees in the quadrature demodulator 20. The distributor 21 divides the reception signal entered from the amplifier 19 so as to distribute two signals having the same phases. Then, multipliers 22, 23 multiply these distributed signals with other signals so as to constitute an I signal and a Q signal which differ in phase at 90 degrees each other. That is, the multipliers 22 and 23 multiply the two distributed signals by the local oscillation signals having the phase difference of 90 degrees from each other.

A 90-degree hybrid 24 produces local oscillation signals having a phase difference of 90 degrees from each other. The local oscillation signal supplied from the local oscillating circuit 11 is inputted to this 90-degree hybrid 24, so that the local oscillation signal having the phase difference by 90 degrees from that of the supplied local oscillation signal. A fixed phase shifter 25 is arranged between the local oscillating circuit 11 and the 90-degree hybrid 24 in order to delay the phase by a value "$\phi 3$." As previously explained, in the first embodiment, the reception signal which does not contain the interference signal is equally divided, and the equally-divided reception signals are multiplied by the local oscillation signals having the phase difference of 90 degrees from each other so as to be quadraturely demodulated.

Next, a detailed description is made of the quadrature modulation feedback circuit. In FIG. 2, there are provided a low-pass filter 26 for removing a high frequency component of the Q signal produced in the quadrature demodulator 20, and a low-pass filter 27 for removing a high frequency component of the I signal produced in the quadrature demodulator 20. Amplifiers 28, 29 amplify signals filtered by the low-pass filters 26, 27, respectively.

A quadrature modulator 30 constitutes a core portion of the above-described quadrature modulation feedback circuit. The quadrature modulator 30 reduces an interference signal mixed into a reception signal, and furthermore, reduces a noise generated from the amplifier 13. The coupler 15 derives a coupling signal having a signal level which is proportional to the transmission signal. The phase of this coupling signal is subsequently controlled and the phase-controlled coupling signal is divided in two signals whose phase difference is 90 degrees, the divided two signals are multiplied by the fed-back I signal and Q signal, respectively. Thereafter, the multiplied I signal is added with the multiplied Q signal so as to synthesize these I and Q signals with each other, and furthermore, a phase and a gain of the synthesized signal are controlled, so that a synthesized high frequency negative feed back signal is produced. In order to realize the function, as will be explained later, it is necessarily required that phases of fixed phase shifters provided in the relevant circuit portions are controlled, and the synthesized high frequency feedback signal constitutes a negative feedback signal. Also, a variable attenuating unit (attenuator) 30a attenuates the signal derived from the coupler 15 in response to the I signal and the Q signal in a proportional manner so as to output a high frequency negative feedback signal.

In FIG. 2, there is provided a 90-degree hybrid which is provided in the quadrature modulator 30, and inputs thereunto the coupling signal whose phase has been controlled. A fixed phase shifter 32 delays the phase of the coupling signal by "$\phi 2$" so as to adjust the phase of this coupling signal. A multiplier 33 multiplies the fed-back I signal by the coupling signal which has been divided in the 90-degree hybrid 31, the phase of the coupling signal being controlled. Similarly, a multiplier 34 multiplies the fed-back Q signal by the coupling signal which has been divided in the 90-degree hybrid 31, and has been controlled in order to have a phase difference of 90 degrees with respect to the first-mentioned coupling signal.

A coupling device 35 constitutes the above-described variable attenuator unit 30a, and synthesizes two signals with each other, which are outputted from the quadrature modulator 30 and have the phase difference of 90 degrees from each other. A fixed phase shifter 36 finally matches a phase of this synthesized signal with the phase of the reception signal. An amplifier 37 outputs as a cancel signal, such a negative feedback signal synthesized by controlling the gain of this synthesized signal.

In the above-described first embodiment, when the coupler 15 derives such a signal which is proportional to the transmission signal, the derived signal is divided into a signal having a phase difference ($\phi 1 + \phi 2$) and another signal having another phase difference ($\phi 1 + \phi 2 + 90$ degrees) by the quadrature modulator 30, while the local oscillation signal is employed as a reference signal. Thereafter, these divided signals are multiplied by an I signal having a phase difference "$\phi 3$" and a Q signal having a phase difference ($\phi 3 + 90$ degrees) with respect to the same local oscillation signal in the quadrature modulator 30. Since the I signal and the Q signal are mixed with the signals derived by the coupler 15 and divided by the quadrature modulator 30, the signals having the phase difference of 90 degrees from each other, the quadrature modulator 30 outputs such a synthesized signal having the phase difference of ($\phi 1 + \phi 2 + \phi 3$) with respect to the phase of the local oscillation signal. In order that this output signal is made as the negative feedback signal, the above-described phase difference of ($\phi 1 + \phi 2 + \phi 3$) may become 180 degrees.

It should also be noted that even when the demodulated output signals (both I signal and Q signal) are inverted and the inverted I and Q signals are utilized, the same result may be achieved. In order to invert these I and Q signals, the amplifiers 28 and 29 may alternatively constructed as inverting amplifiers, In this alternative case, the phase difference of ($\phi 1 + \phi 2 + \phi 3$) may become 0 degrees. In such a case that the phase difference of ($\phi 1 + \phi 2 + \phi 3$) is shifted from 180 degrees or 0 degree, the stability of the negative feedback is deteriorated in response to a shift of the phase difference.

The phase and the gain of the output signal from this variable attenuator unit 30a are finally controlled by the fixed phase shifter 36 and the amplifier 37, and then, the phase/gain-controlled signal is added and mixed with the reception signal to which the interference signal has been mixed in the coupling device 17. As a result, the interference signal mixed in the reception signal can be cancelled, and the level of the noise generated from the transmission side, and which have been contained in the reception signal, can be reduced.

As previously described, since the wireless communication apparatus of the first embodiment employs the quadrature modulation negative feedback circuit, the signals derived from the transmission circuit are fed back, and also, the fed-back signals are synthesized with the I signal and the Q signal in the variable attenuating unit 30a and then the synthesized signal is outputted so as to reduce the interference signal.

Therefore, even when the transmission signal is mixed into the reception signal, the higher receiver sensitivity can be achieved. While the arrangement of the quadrature demodulator 20 inherent to the wireless communication apparatus can be sufficiently reflected in this wireless communication apparatus, the wireless communication apparatus can be easily manufactured and can respond to the changes in the circumferential environment in real time, and, at the same time, can remove the adverse influence caused by the noise which is generated when the transmission signal is amplified.

Since the RSSI circuit and the variable phase shifter are not employed, the detection precision does not depend upon the RSSI circuit, but also, the delay in the control operation never constitutes the problem. The effect of the quadrature modulator 30 which functions as the variable attenuator in the multiplying operation between the I signal and the Q signal, and the phase difference by the fixed phase shifter are merely set, so that the wireless communication apparatus can reduce the level of the interference signal under stable condition.

The above-described operations will now be explained in a supplementary manner with reference to waveforms.

Figure 4:
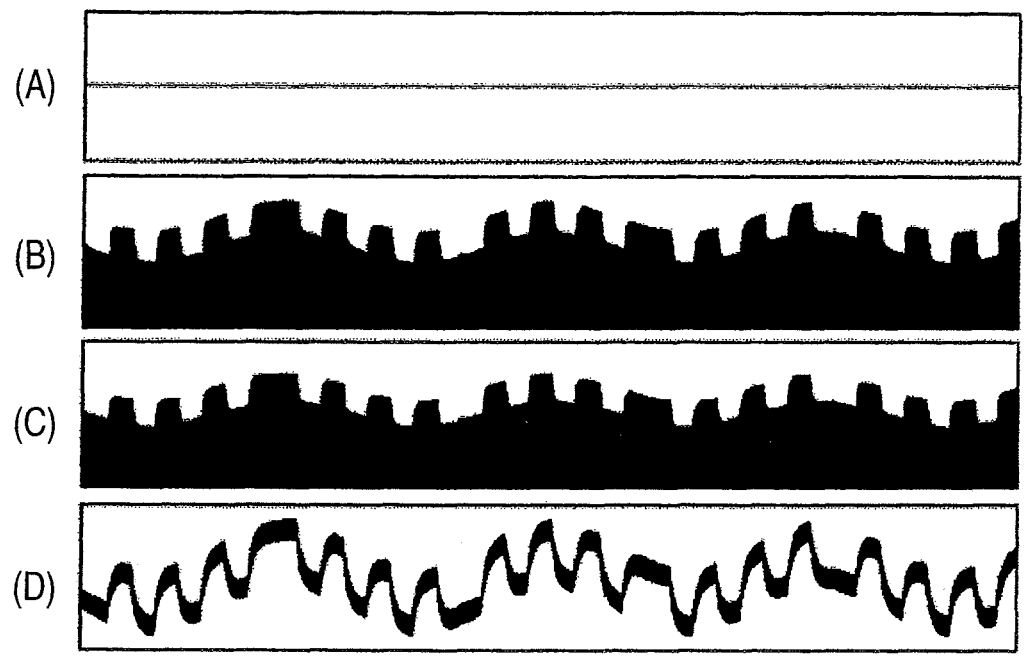
FIG. 4 represents reception waveforms in the case that a cancel signal is not present.
Figure 5:
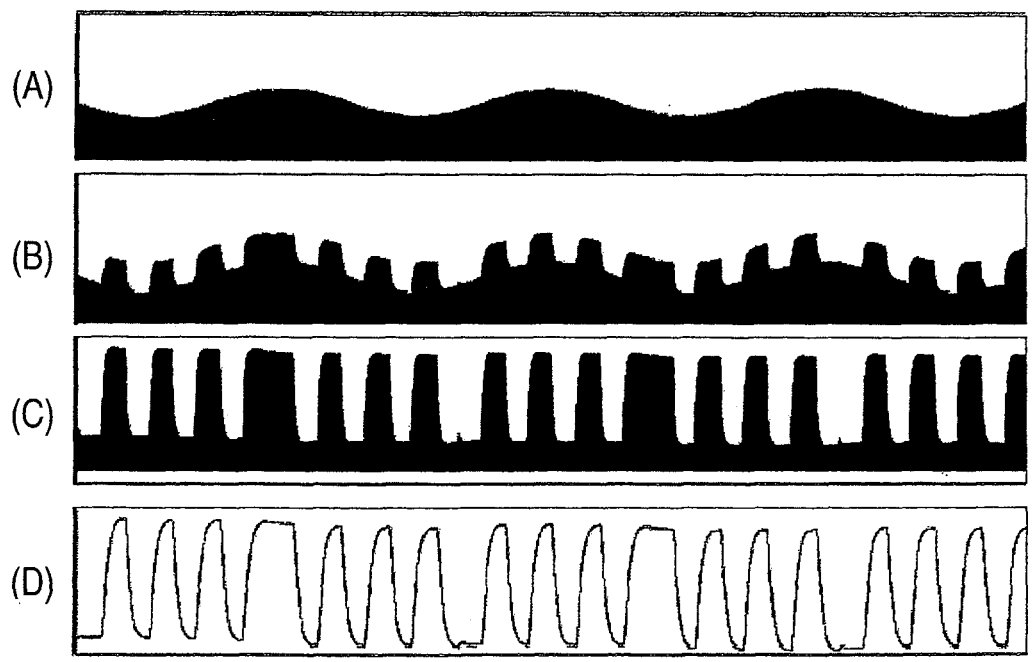
FIG. 5 represents reception waveforms in the case that the cancel signal is present.

FIG. 4 shows reception waveforms in the case that a cancel signal is not present, whereas FIG. 5 indicates reception waveforms in the case that the cancel signal is present.

Symbol (A) indicates a cancel signal A subsequent to the amplifier 37; symbol (B) represents a reception waveform B produced in such a case that a wraparound noise of a transmission wave subsequent to the antenna duplexer 16 has been mixed with a reception signal transmitted from the wireless tag; symbol (C) shows a reception waveform 40 subsequent to either the multiplier 22 or the multiplier 23 in such a case that a cancel signal A is coupled to the reception waveform B; and symbol (D) indicates a reception waveform after a reception waveform C has been filtered by either the low-pass filter 26 or the low-pass filter 27. It should be noted that portions which are painted over in these drawings represent amplitudes of high frequency signal waves; and since these high frequency signal waves are vibrated in a tight amplitude mode, for the sake of convenient illustrations, these wave portions have been painted over, as represent in these drawings.

FIG. 4 indicates such a case that the cancel signal (A) is not present. As indicated in the cancel signal (A), since the signal is not inputted, there is no difference between the reception signal (B) and the reception signal (C), which correspond to the signal before being canceled and the signal after being canceled; it can be understood that the wraparound noise of the transmission wave cannot be reduced; and then, such a fact that this wraparound noise cannot be removed even when a filter, and the like are employed is indicated in the reception waveform (D).

To the contrary, FIG. 5 is such a condition that a signal which constitutes a source of the cancel signal (A) is derived from the transmission signal by the coupler 15, and then, such a cancel signal (A) shown in FIG. 5 is entered.

In FIG. 5, since the cancel signal (A) is inputted, a large difference may be observed between the reception waveform (B) corresponding to the signal before being canceled, and the reception waveform (C) after being canceled; such a fact that the wraparound noise of the transmission wave has been reduced is represented; and thus, a necessary signal can be derived by employing a filter, or the like.

Second Embodiment

Figure 3:
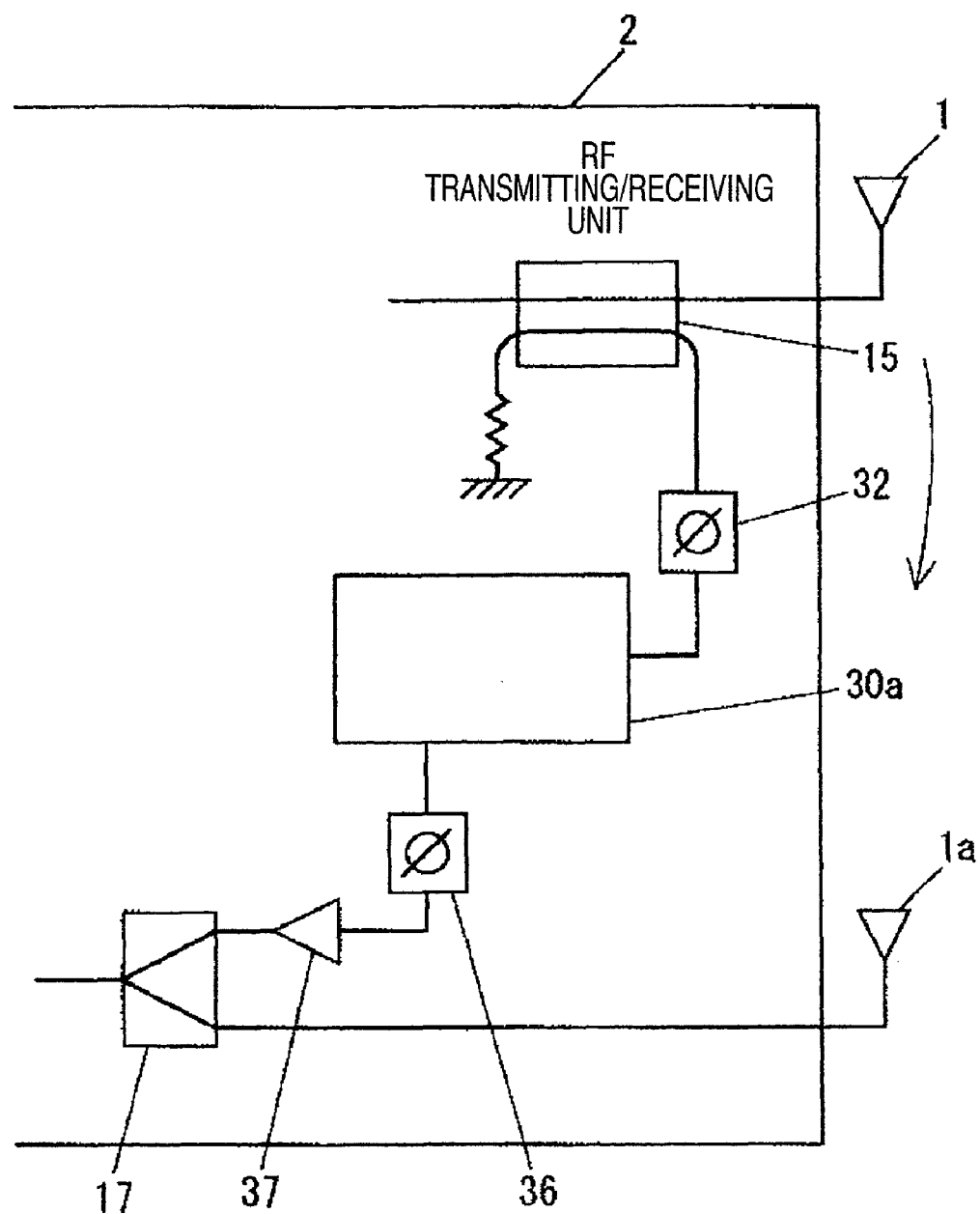
FIG. 3 is a circuit diagram for indicating a major portion of an RF transmitting/receiving unit of a wireless communication apparatus according to a second embodiment of the present invention.

A description is made of a wireless communication apparatus according to a second embodiment of the present invention. The wireless communication apparatus of the second embodiment corresponds to such a wireless communication apparatus equipped with a transmission-purpose antenna and a reception-purpose antenna in an independent manner, while an antenna duplexer is not provided therein. FIG. 3 is a circuit arrangement diagram for showing a major portion of an RF transmitting/receiving unit of the wireless communication apparatus according to the second embodiment of the present invention. It should be understood that since the basic structure of the wireless communication apparatus of the first embodiment is commonly employed as a basic structure of this wireless communication apparatus according to the second embodiment, the same reference numerals shown in the first embodiment will be employed as those for indicating the same structures shown in the second embodiment, and therefore, explanations thereof will be omitted in this second embodiment. As a consequence, a description is made of the wireless communication apparatus with reference also to FIG. 1 and FIG. 2.

In FIG. 3, there is provided an antenna 1a which receives reflection waves from a wireless tag (not shown). This antenna 1a corresponds to a second antenna of the present invention, and the antenna 1 corresponds to the first antenna of the present invention. As a consequence, a transmission signal is not directly mixed in a receiving circuit via the antenna duplexer as explained in the first embodiment. However, in this case, as shown in FIG. 3, the transmission wave transmitted from the first antenna 1 is directly received, or is received via a reflection object by the second antenna 1a, so that the reception signal from the wireless tag is mixed with the transmission signal.

As a result, similar to the above-described first embodiment, in the present second embodiment, although not shown in FIG. 3, an quadrature modulation feedback circuit is provided; and the signals derived from the transmission circuit are fed back; and also, the fed-back signals are synthesized with the I signal and the Q signal in the variable attenuating unit and then the synthesized signal is outputted so as to reduce the interference signal. As a consequence, even when the transmission signal is mixed into the reception signal, the higher receiver sensitivity can be achieved. While the arrangement of the quadrature demodulator provided in the wireless communication apparatus can be sufficiently reflected in this wireless communication apparatus, the wireless communication apparatus can be easily manufactured and can respond to the changes in the circumferential environment in real time, and, at the same time, can remove the adverse influence caused by the noise which is generated when the transmission signal is amplified. The effect of the quadrature modulator which functions as the variable attenuator in the multiplying operation between the I signal and the Q signal, and the phase difference by the fixed phase shifter are merely set, so that the wireless communication apparatus can reduce the level of the interference signal under stable condition.

This application is based upon and claims the benefit of priority of Japanese Patent Application No. 2007-111299 filed on Apr. 20, 2007, the contents of which are incorporated herein by reference in its entirety.

What is claimed is:

1. A wireless communication apparatus for demodulating modulated information which is transmitted from a wireless tag so as to read out the modulated information, comprising:
an antenna which transmits a transmission signal to the wireless tag and receives a signal transmitted from the wireless tag as a reception signal;

a demodulator which demodulates the reception signal to output a demodulated signal;

a signal outputter which outputs a proportional signal proportional to the transmission signal; and a controller which calculates the proportional signal and the demodulated signal to output a calculated signal, and calculates the calculated signal and the reception signal, wherein the controller includes an attenuator which calculates a signal level of the proportional signal and the demodulated signal, wherein the demodulator comprises a quadrature demodulator which divides the reception signal into two signals which differ in phase by 90 degrees to each other to demodulate the two signals, and wherein the attenuator includes a quadrature modulator which divides the proportional signal into two signals which differ in phase by 90 degrees to each other, and multiplies the two signals divided by the quadrature modulator by the two signals demodulated by the quadrature demodulator, respectively.

2. The wireless communication apparatus as claimed in claim 1, wherein the antenna is a single antenna; and wherein a transmission side of the antenna is connected via an antenna duplexer to a reception side of the antenna.

3. The wireless communication apparatus as claimed in claim 1, wherein a phase difference between the demodulated signal demodulated by the quadrature demodulator and the proportional signal output by the signal outputter is 180 degrees.

4. The wireless communication apparatus as claimed in claim 1, wherein a phase difference between the demodulated signal demodulated by the quadrature demodulator and the proportional signal output by the signal outputter is 0 degrees.

5. The wireless communication apparatus as claimed in claim 1, wherein the controller calculates the proportional signal and the demodulated signal by multiplication.

6. The wireless communication apparatus as claimed in claim 1, wherein the controller calculates the calculated signal and the reception signal by addition.

7. The wireless communication apparatus as claimed in claim 1, wherein the controller performs a feedback control in order to reduce an interference signal mixed in the reception signal based upon the transmission signal and the demodulated signal.

8. A wireless communication apparatus for decoding response information of a wireless tag, comprising: a first antenna for transmitting a transmission signal for requesting a reading operation to the wireless tag; a second antenna for receiving a response signal transmitted from the wireless tag as a reception signal; a quadrature demodulator which divides the reception signal into two signals which differ in phase by 90 degrees to demodulate the two signals; an amplifier which amplifies a modulated signal obtained after a signal for requesting the reading operation has been modulated to output an amplified signal; a duplexer which is provided between the amplifier and the first antenna, and outputs a proportional signal having a level proportional to a level of the amplified signal; an attenuator which negatively feeds back the two demodulated signals which differ in phase by 90 degrees, and adjusts a signal level of the proportional signal based upon the two feedback signals; and a controller which mixes the reception signal with the adjusted signal derived from the attenuator by a coupling device to reduce an interference signal mixed in the reception signal.

* * * * *